US011184765B2

(12) United States Patent
Suwirya et al.

(10) Patent No.: US 11,184,765 B2
(45) Date of Patent: Nov. 23, 2021

(54) METHOD FOR AUTHENTICATING A USER AND CORRESPONDING USER DEVICE, SERVER AND SYSTEM

(71) Applicant: GEMALTO INC, Austin, TX (US)

(72) Inventors: Darmawan Suwirya, Austin, TX (US); Asad Mahboob Ali, Austin, TX (US)

(73) Assignee: THALES DIS FRANCE SA, Meudon (FR)

( * ) Notice: Subject to any disclaimer, the term of this patent is extended or adjusted under 35 U.S.C. 154(b) by 49 days.

(21) Appl. No.: 15/656,861

(22) Filed: Jul. 21, 2017

(65) Prior Publication Data

US 2019/0028891 A1    Jan. 24, 2019

(51) Int. Cl.
*H04W 12/06* (2021.01)
*G06F 21/35* (2013.01)
(Continued)

(52) U.S. Cl.
CPC ............ *H04W 12/06* (2013.01); *G06F 21/35* (2013.01); *H04L 63/0853* (2013.01);
(Continued)

(58) Field of Classification Search
CPC ....... H04W 12/06; H04W 4/80; H04W 8/005; H04W 8/18; H04W 48/02; H04L 63/08;
(Continued)

(56) References Cited

U.S. PATENT DOCUMENTS 8,646,056 B2 * 2/2014 Poplett .................... G06F 21/31
726/2
9,075,979 B1 * 7/2015 Queru .................... G06F 21/34
(Continued)

FOREIGN PATENT DOCUMENTS

EP    2 863 669 A1    4/2015

OTHER PUBLICATIONS

Y. Watanabe, M. Otani, H. Eto, K. Watanabe and S. Tadaki, "A MAC address based authentication system applicable to campus-scale network," 2013 15th Asia-Pacific Network Operations and Management Symposium (APNOMS), Hiroshima, 2013, pp. 1-3. (Year: 2013).*

S. Bouzefrane, A. F. B. Mostefa, F. Houacine and H. Cagnon, "Cloudlets Authentication in NFC-Based Mobile Computing," 2014 2nd IEEE International Conference on Mobile Cloud Computing, Services, and Engineering, 2014, pp. 267-272, doi: 10.1109/MobileCloud.2014.46. (Year: 2014).*

(Continued)

*Primary Examiner* — Robert B Leung
*Assistant Examiner* — Sameera Wickramasuriya
(74) *Attorney, Agent, or Firm* — Buchanan Ingersoll & Rooney PC (57) ABSTRACT

A method for authenticating a user includes connecting to a server from a user device, loading from the server to the user device data including executable data, detecting by the user device, while executing the executable data, whether an identifier relating to a short range communication device exists in a vicinity of the user device, sending from the user device to the server a user identifier accompanied with the detected short range communication device identifier, verifying by the server for the identified user whether a detected short range communication device identifier matches a predetermined part of a reference short range communication device identifier. Access is granted from the server only if the detected short range communication device identifier matches the predetermined part of the reference short range communication device identifier.

8 Claims, 2 Drawing Sheets

(51) Int. Cl.
- *H04L 29/06* (2006.01)
- *H04W 12/71* (2021.01)
- *H04W 4/80* (2018.01)
- *H04W 48/02* (2009.01)
- *H04W 8/18* (2009.01)
- *H04W 8/00* (2009.01)
- *H04L 29/08* (2006.01)

(52) U.S. Cl.
CPC .............. *H04L 63/107* (2013.01); *H04W 4/80* (2018.02); *H04W 12/71* (2021.01); *H04L 67/34* (2013.01); *H04L 67/42* (2013.01); *H04W 8/005* (2013.01); *H04W 8/18* (2013.01); *H04W 48/02* (2013.01)

(58) Field of Classification Search
CPC ....... H04L 63/107; H04L 63/10; H04L 67/00; H04L 67/42; G06F 21/30
See application file for complete search history.

(56) References Cited

U.S. PATENT DOCUMENTS

| | | | |
|---|---|---|---|
| 9,104,853 B2* | 8/2015 | Mathur | G06F 21/35 |
| 2002/0169988 A1* | 11/2002 | Vandergeest | H04L 63/0823 726/4 |
| 2008/0289030 A1* | 11/2008 | Poplett | G06F 21/31 726/15 |
| 2009/0265775 A1* | 10/2009 | Wisely | H04L 63/0492 726/9 |
| 2011/0313922 A1* | 12/2011 | Ben Ayed | G06Q 30/06 705/42 |
| 2013/0145420 A1* | 6/2013 | Ting | H04L 63/08 726/1 |
| 2013/0174252 A1* | 7/2013 | Weber | G06F 21/6218 726/20 |
| 2014/0282877 A1* | 9/2014 | Mahaffey | H04L 63/0853 726/3 |
| 2014/0344904 A1* | 11/2014 | Venkataramani | G06F 21/35 726/5 |
| 2015/0188891 A1* | 7/2015 | Grange | H04L 63/06 380/270 |
| 2015/0215299 A1* | 7/2015 | Burch | H04L 63/08 726/5 |
| 2017/0098335 A1* | 4/2017 | Payack, Jr. | G07C 9/00007 |
| 2017/0180539 A1* | 6/2017 | Payack, Jr. | H04M 1/72533 |
| 2017/0302659 A1* | 10/2017 | Shteingart | H04L 63/0853 |
| 2017/0359339 A1* | 12/2017 | Hevizi | H04W 4/80 |

OTHER PUBLICATIONS

Notification of Transmittal of the International Search Report and the Written Opinion of the International Searching Authority (Forms PCT/ISA/220, PCT/ISA/210, and PCT/ISA/237) dated Aug. 21, 2018, in the corresponding International Application No. PCT/EP2018/068410. (15 pages).

* cited by examiner

METHOD FOR AUTHENTICATING A USER AND CORRESPONDING USER DEVICE, SERVER AND SYSTEM

FIELD OF THE INVENTION

The present invention relates generally to a method for authenticating a user.

Furthermore, the invention pertains to a user device for authenticating a user.

The present invention is notably applicable to a field in which the user device is a user terminal, such as a Personal Computer (or PC) or a mobile (tele)phone.

Moreover, the invention is a server for authenticating a user.

Finally, the invention relates to a system for authenticating a user. The system includes a server and at least one user device.

STATE OF THE ART

It is known to authenticate a user by using a web browser of a PC to submit, through a web page, a user name and a password, as (user) (login) credentials, to be verified on-line by a server that accesses reference credentials.

To improve the authentication in terms of security, it is also known to add to such a single Factor Authentication (or FA) (what the user knows), a second FA (what the user has). The second factor may be e.g., a smart card, as a Secure Element (or SE), to be connected to the PC, or a One Time Password (or OTP) to be generated by an SE that is not connected to the PC and dedicated to generating the OTP. The SE is owned by the PC user to be authenticated.

Within the present description, an SE is a smart object that includes a chip(s) that protect(s), as a tamper resistant component(s), access to stored data and that is intended to communicate data with a device(s), like e.g., an SE host device, and/or an SE user.

However, such an SE has to be issued and configured by a service provider, rendering thus complicated and expensive the SE deployment, so as to authenticate a user.

There is a need of an alternative solution for authenticating a user while being easy and cheap to deploy.

SUMMARY OF THE INVENTION

The invention proposes a solution for satisfying the just herein above specified need by providing a method for authenticating a user.

According to the invention, a server registers at least one user identifier associated with at least one identifier relating to at least one reference short range communication device to be detected in a vicinity of at least one user device. The method comprises the following steps: connecting to the server from a user device, loading from the server to the user device data including executable data, detecting by the user device, while executing the executable data, whether at least one identifier relating to at least one short range communication device does or does not exist in a vicinity of the user device, sending from the user device to the server at least one user identifier accompanied with the at least one detected short range communication device identifier only if the at least one identifier relating to at least one detected short range communication device exists in the vicinity of the user device, verifying by the server for the identified user whether the at least one detected short range communication device identifier or no detected short range communication device identifier does or does not match at least a predetermined part of the at least one reference short range communication device identifier. The method comprises the following steps: granting access from the server only if the at least one detected short range communication device identifier matches the at least predetermined part of the at least one reference short range communication device identifier, or denying access while requesting user authentication data by sending from the server to the user device a corresponding message only if the at least one detected short range communication device identifier or no detected short range communication device identifier does not match the at least predetermined part of the at least one reference short range communication device identifier.

The principle of the invention consists in using a server to let query or detect dynamically, i.e. thanks to executable data (or code) that is sent from the server and executed by a connected user device, by the user device whether (or not) one or several Short Range (or SR) communication devices are present in proximity to the user device. In the affirmative, the user device transmits to the server one or several user identifiers and an identifier(s) relating to each detected short range communication device. The server checks whether (or not) none or one or several detected SR communication device identifiers match(es) at least a predefined part of one or several reference SR communication device identifiers that have been previously registered at the server for the user. If none or one or several detected SR communication device identifiers do(es) not match at least the predefined part of one or several reference SR communication device identifiers, then the server does not authorize access to the server while sending to the user device a message requesting the user to authenticate. Otherwise, i.e. if one or several detected SR communication device identifiers match(es) at least the predefined part of one or several reference SR communication device identifiers, the server authorizes access to the server.

The user authentication is thus based on a detection of a presence of one or several reference SR communication devices in proximity to (or in a vicinity of) the user device.

The fact that one or several SR communication devices are detected in proximity to the user device means that the detected SR communication device(s) is(are) able to communicate with the user device by using a SR Radio-Frequency (or RF) link(s), i.e. wirelessly.

It is to be noted that the invention does not impose any constraint as to the SR RF link. The SR RF link may be related to any wireless technology, like e.g., Near Field Communication (or NFC) (registered trademark), Wi-Fi (registered trademark), Bluetooth (or BTH) (registered trademark) or Bluetooth Low Energy (or BLE) (registered trademark).

Only the user who has at least the predefined part of one or several reference SR communication devices that is present in proximity to the user device is thus able to authenticate successfully to the server.

Such a user device environment, namely surrounded with one or several reference SR communication devices, possibly completed additionally by user authentication data allow(s) authenticating successfully the user through the device to the server.

It is to be noted that the invention does not impose any constraint as to the user authentication data. The user authentication data may include a Personal Identity Number (or a PIN), a password(s), an OTP(s), a user credential(s) and/or a user biometric feature(s).

The user device may be a standalone entity or may cooperate with another entity(ies), such as an embedded chip, to authenticate more securely a user(s).

The invention solution allows authenticating securely a system or device user, as something that surrounds the user device, as a single FA or an additional FA.

Thus, the invention solution is simple, quick and user convenient, since the user does not need to interact with the user device to be authenticated to the server. The simplicity of the invention solution facilitates its adoption by the user.

The invention solution is easy and cheap to deploy to authenticate a user since there is no need to issue and configure any device, such as an SE. The simplicity of the invention solution facilitates its deployment.

The invention solution does not need to access neither user credentials nor data that is stored at the user device side.

The invention solution does not need to access a dedicated device(s), such as an SE(s).

Nevertheless, the invention solution is secure since at least the predetermined part of the reference SR communication devices is under control of the user and therefore her/his authentication to the server.

The invention solution allows authenticating strongly the user who uses a user device which is surrounded with at least the predetermined part of the reference SR communication devices.

The invention solution constitutes an adaptive authentication in the sense that the predetermined part of the reference SR communication devices is under control of a server administrator (or on its behalf) and may be adapted, as to in terms of the number of the reference SR communication devices needed for a given user authentication method.

According to an additional aspect, the invention is a user device for authenticating a user.

According to the invention, the user device is configured to connect to a server, to load data including executable data, to detect, while executing the executable data, whether at least one identifier relating to at least one short range communication device does or does not exist in a vicinity of the user device. And the user device is configured to send to the server at least one user identifier accompanied with the at least one detected short range communication device identifier only if the at least one identifier relating to at least one detected short range communication device exists in the vicinity of the user device.

The user device may be a user terminal, like e.g., a PC, a mobile phone or an SE, or any kind of communicating and computing device.

According to still an additional aspect, the invention is a server for authenticating a user.

According to the invention, the server registers at least one user identifier associated with at least one identifier relating to at least one reference short range communication device to be detected in a vicinity of at least one user device. The server is configured to be connected from a user device, to load into the user device data including executable data and to receive from the user device at least one user identifier accompanied with the at least one detected short range communication device identifier only if the at least one identifier relating to at least one detected short range communication device exists in a vicinity of the user device. The server is configured to verify for the identified user whether the at least one detected short range communication device identifier or no detected short range communication device identifier does or does not match at least a predetermined part of the at least one reference short range communication device identifier. And the server is configured to grant access only if the at least one detected short range communication device identifier matches the at least predetermined part of the at least one reference short range communication device identifier. Or the server is configured to deny access while requesting user authentication data by sending from the server to the user device a corresponding message only if the at least one detected short range communication device identifier or no detected short range communication device identifier does not match the at least predetermined part of the at least one reference short range communication device identifier.

According to still a further aspect, the invention is a system for authenticating a user.

According to the invention, the system includes a server and at least one user device. The server registers at least one user identifier associated with at least one identifier relating to at least one reference short range communication device to be detected in a vicinity of at least one user device. A user device is configured to connect to the server. The server is configured to load into the user device data including executable data. The user device is configured to detect, while executing the executable data, whether at least one identifier relating to at least one short range communication device does or does not exist in a vicinity of the user device. The user device is configured to send to the server at least one user identifier accompanied with the at least one detected short range communication device identifier only if the at least one identifier relating to at least one detected short range communication device exists in the vicinity of the user device. The server is configured to verify for the identified user whether the at least one detected short range communication device identifier or no detected short range communication device identifier does or does not match at least a predetermined part of the at least one reference short range communication device identifier. And the server is configured to grant access only if the at least one detected short range communication device identifier matches the at least predetermined part of the at least one reference short range communication device identifier. Or the server is configured to deny access while requesting user authentication data by sending from the server to the user device a corresponding message only if the at least one detected short range communication device identifier or no detected short range communication device identifier does not match the at least predetermined part of the at least one reference short range communication device identifier.

The system may include, at the client side, a Terminal Equipment (or TE) including a mobile phone, as a first device, and an SE, as a second device.

BRIEF DESCRIPTION OF THE DRAWINGS

Additional features and advantages of the invention will be apparent from a detailed description of one preferred embodiment of the invention, given as an indicative and non-limitative example, in conjunction with the following drawings.

DETAILED DESCRIPTION

Herein under is considered an exemplary embodiment in which the invention method for authenticating a user is implemented by a PC, as a user device for authenticating a user and a standalone entity, i.e. without cooperating with another device, such as an SE.

According to another exemplary embodiment (not represented), the invention method for authenticating a user is implemented by a user terminal in cooperation with an SE. According to such an embodiment, the SE, as the device for authenticating a user, is adapted to perform the functions that are carried out by the PC and described herein while further providing a secure processing and preferably a secure exchange with the server.

The SE may be an incorporated chip, as a chip soldered, possibly in a removable manner, like e.g., an embedded SE, an embedded Universal Integrated Circuit Card (or eUICC) or an integrated Universal Integrated Circuit Card (or iUICC), on a Printed Circuit Board (or PCB) of a host computer device, as an SE host device, or a chip that is coupled to the user terminal, as an SE host device, and included within a Universal Serial Bus (or USB), a smart card or any other medium that may have different form factors. The chip may therefore be fixed to or removable from its host device, like e.g., a PC or a mobile phone.

The invention does not impose any constraint as to a kind of the SE type.

Figure 1:
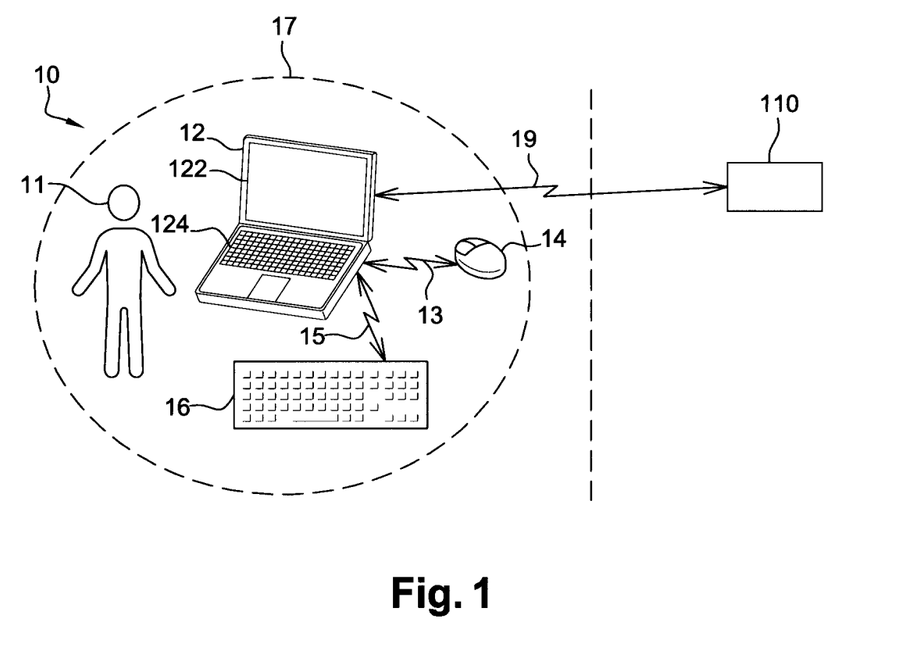
FIG. 1 illustrates a simplified diagram of one exemplary embodiment of a system comprising a PC that executes a (web) browser, as a client, a mouse and a keyboard, as two SR communication devices, both wirelessly connected to the PC, and a server, the system being adapted, on a basis of a presence of one or two reference SR communication devices to be detected on-line, through the client, by the server, to authenticate securely the PC user, according to the invention.

Naturally, the herein below described embodiment is only for exemplifying purposes and is not considered to reduce the scope of the present invention. FIG. 1 shows schematically a system 10 for authenticating a user 11 with a PC 12 and a (web) server 110.

Instead of being constituted by a PC, the user device may be constituted by, e.g., a mobile phone, a smart phone (i.e. a mobile phone with a Personal Digital Assistant (or PDA) capability), a set-top box, a tablet computer, a desktop computer, a laptop computer, a video player, an audio player, a media-player, a game console, a netbook, a PDA or any other computer device connected to or including a Man Machine Interface (or MMI).

For the sake of simplicity, only one PC 12, as a user device, has been represented.

The user 11 uses the PC 12 to connect to the server 110, as a user authentication server.

However, several PCs, as client devices, may communicate, at the same time or at different times, with the server 110, so as to access one or several services provided by or through the server 110.

The PC 12 includes one or several (micro)processor(s) and/or (micro)controller(s) (not represented), as data processing means, one or several memories (not represented), as data storing means, and two or more Input/Output (or I/O) interfaces (not represented).

The PC processor processes data originating from and/or intended to any internal component and data originating from and/or intended to any external device through one PC I/O interface.

The PC processor executes notably, besides an Operating System (or OS), the browser application, as a client, and preferably the script engine, as a script interpreter, that is accessible from the client.

The PC I/O interface comprises preferably a display screen 122 and a keyboard 124, as an MMI, so as to interact with a PC user who desires to benefit from the service(s) supplied by or through the server 110.

The display screen(s) 122 may be used for presenting a set of one or several SR communication device(s) that has (have) been detected by the PC 12 and that exist(s) in a vicinity of the PC 12 or an area 17 surrounding the PC 12, as local user environment.

The PC MMI is used for presenting information to the PC user 11, like e.g., a message for prompting or requesting the user to select one or several SR communication device(s) that has(have) been detected by the PC 12 and that exist(s) in a vicinity of the PC 12. The PC user 11 may thus select any SR communication device of her/his choice when the SR communication device is able to communicate using any (local) wireless communication protocol, such as Wi-Fi, Bluetooth or NFC.

The PC I/O interface includes one or more I/O interfaces for exchanging data, via a communication network (not represented), through a bidirectional wire or wireless link 19, with the server 110.

The PC I/O interface with the server 110 may use a HyperText Transfer Protocol (or HTTP), a File Transfer Protocol (or FTP) and/or another data communication protocol(s), so as to communicate with the server 110.

The PC 12 supports a (web) type browser application.

The browser application may be, as known per se, a Microsoft Internet Explorer (registered trademark), a Mozilla Firefox (registered trademark) application, or any other (web type) browser application.

The browser application of the client user device plays a role of a client that attempts to load one or several (web) pages from the server 110.

According to an alternative, instead of the web type browser application, the client is a proprietary application, such as a desktop application, i.e. an application that is typically only accessible by an issuer (or provider) of the considered application, that accesses a script interpreter.

The service(s) provided by or through the server 110 may satisfy World Wide Web Consortium (or W3C) type rules.

A (computer) mouse 14, as a first SR communication device or Device 1 (or D1), may be connected, through a first wireless link 13, to the PC 12.

The mouse 14 is, as known per se, a pointing device controlled by e.g., a user (hand) and that detects a two-dimensional motion relative to a surface on which the mouse 14 is present. The motion is typically translated into a motion of a pointer on the PC display screen 122, which allows a control of a graphical user interface. The mouse 14 may allow the user 11 to select one or several elements, such as one or several SR communication device(s), like e.g., D1 (and/or D2), to be used for being authenticated, that is(are) pointed by the mouse 14 and displayed by the display screen 122.

The first wireless link 13 is at least mono-directional, i.e. from the D1 14 to the PC 12.

Besides or instead of the D1, a (computer) keyboard 16, as a second SR communication device or Device 2 (or D2), may be connected, through a second wireless link 15, to the PC 12. The keyboard 16 includes, as known per se, a set of buttons or keys. A depress of a key(s) allows the user 11 to write a symbol or to let execute by the PC 12 a command.

The second wireless link 15 is at least mono-directional, i.e. from the D2 16 to the PC 12.

As wireless link(s) 13 and/or 15, it may include a link(s) relating to an NFC (registered trademark), a Wi-Fi (registered trademark), a Bluetooth (registered trademark) and/or BLE (registered trademark) type, as an RF link(s) with an SR distance (typically up to around 10 m).

One or several SR communication devices, like e.g., the D1 14 and/or the D2 16, may be paired with the PC 12. Each of the pairing(s) between the SR communicating device and the PC 12 may be secure, i.e. protects data exchanged between each other.

The SR communication device(s) may include a mobile phone, a wearable device, such as a watch or a workout bracelet, a speaker, a headphone, a smart pen, a weight scale or any device that is able to communicate, through an SR RF link, with the PC 12.

The SR communication device(s), as a reference SR communication device(s), may have to be present in a vicinity of the PC 12, so as to authenticate the user.

During a registration to the server 110, the user 11 may select, among a set of one or several reference SR communication devices that are associated with the (identified) user 11 and to be detected in a vicinity of the PC 12, the reference SR communication device(s) to be used for being authenticated by or through the server 110.

The reference SR communication device(s) do(es) not need to have any particular software stack, such as e.g. a FIDO protocol stack, and/or to be configured in a dedicated or specific way.

A PC memory stores preferably a browser application, as a client, and a script engine.

A script is a character string and constitutes executable data. The script is embedded within a (web) page, such as a page that is written in a HyperText Markup Language (or HTML). The script is constituted by, for example, a JavaScript (registered trademark), an ActiveX (registered trademark) or an Adobe (registered trademark) type script.

The script engine interprets and executes dynamically, i.e. during a communication session that is opened with the server 110, at least in part a script to be received, as executable data.

According to a preferred embodiment, the client delegates to the script engine an interpretation of a script to be issued by the server 110, so as to address to an authentication application to be executed by the PC 12 executable data comprised within the script and allowing the PC 12 to determine or detect a presence of one or several SR communication devices. The authentication application may be constituted by a library that the PC 12 supports and that is dedicated to detecting a presence of one or several SR communication devices.

According to an essential feature of the invention, the PC 12, and more exactly the client (application), is adapted to detect, while executing executable data to be received from or through the server 110, whether (or not) one or several identifiers relating to one or several SR communication devices exist in a vicinity of the PC 12, as a particular user device or possibly any other user device, such as a tablet and/or a mobile phone.

According to another essential feature of the invention, the PC 12, as a particular client (application) registered at the server 110 side, is arranged to send to the server 110 (application) a first user authentication message(s) including data for identifying the user 11, as an user identifier(s), like e.g. a user name, and, when an SR communication device(s), such as D1 14 and/or D2 16, has(have) been detected as being in the vicinity of the PC 12 and possibly further selected by the user 11, one (or several) identifier(s) relating to the detected (surrounding) SR communication device(s). The first user authentication message(s), as a first request to authenticate the user 11, allow(s) the user 11 to authenticate (or not) to the server 110.

The first user authentication message(s) may be sufficient to allow the server 110 to authenticate successfully the user 11 based on a local presence of an (identified) reference SR communication device(s), as a single factor authentication and a proof of a user environment. In case of successful authentication, the user 11 becomes an authorized interlocutor of the server 110, so as to continue an open communication session with the server 110 possibly for a predefined extension time period, like e.g, 1 min or a few minutes.

The PC 12 is preferably able to get or capture (or let capture) from the user 11 user authentication data, like e.g., a PIN(s), a password(s), an OTP(s), a user credential(s), a user biometric feature(s), such as a fingerprint(s).

The PC 12 is preferably able to transmit to the server 110 a second user authentication message(s) including the user authentication data that has been submitted by the user 11 and captured by or through the PC 12. The second user authentication message(s), as a second request to authenticate the user 11 with the submitted user authentication data, allow(s) the user 11 to authenticate (or not) before (or to) the server 110 based on further user authentication data, as an additional factor authentication.

The second user authentication message(s) may be needed to allow the server 110 to authenticate successfully the user 11. In case of successful authentication, the user 11 becomes an authorized interlocutor of the server 110, so as to continue an open communication session with the server 110 possibly for a predefined extension time period, like e.g, 1 min or a few minutes.

When the communication session is allowed to be extended possibly for a first time, the communication session is extended, once by the predefined extension time period, to an expiration time corresponding to a time at which the communication session is open completed by one extension time period.

When the communication session is allowed for at least another time, the communication session is extended at least by the predefined extension time period from the last calculated expiration time.

The open communication session may be thus periodically extended while the client sends to the server 110 expected SR communication device identifiers, as the reference SR communication device identifiers.

Only the user who uses the PC 12 with at least the predetermined part of the reference SR communication devices that is or are present in the PC 12 surrounding area 17 is able to be successfully authenticated to the server 110.

As soon as the client (possibly with a help of another software component and/or another application executed by the PC 12) does not submit one or several identifiers relating to at least the predetermined part of the reference SR communication devices, the server 110 closes the open communication session at the end of a last calculated expiration time, when applicable.

After that the server 110 that has checked that the detected (surrounding) SR communication device(s) is(are) not or no longer sufficient to authenticate successfully the user 11 (without submitting any user authentication data), the PC 12 may receive from or through the server 110 a request to get (or let get) user authentication data.

As soon as the previously detected SR communication device(s), as at least the predetermined part of the reference SR communication device(s), is no longer present, the client (thanks to the script) is no longer able to submit to the server 110 the previously detected SR communication device identifier(s). Accordingly, the server 110 forbids its interlocutor to continue the open communication session between the client and the server 110 by sending possibly to its interlocutor a message for indicating that the open communication session is terminated.

The server 110 is remote, i.e. accessible through at least one communication network, such as an Intranet network, an Internet network and/or a mobile radio-communication network.

According to an alternative (not represented), the server 110 is local. For example, the server 110 is embedded within the PC 12 or an SE that is connected or coupled to the PC 12.

The server 110 may be operated or managed by a Mobile Network Operator (or MNO), a Mobile Virtual Network Operator (or MVNO), a banking Operator, a wire communication network operator, a service Operator (or administrator) or on behalf of a service Operator, as a service provider.

The service provider determines preferably a number, as a threshold value, of the reference SR communication device(s) to be detected in a vicinity of a user device, as the predetermined part of the reference SR communication device(s) to be detected in a vicinity of a user device. Such a number is determined to be more or less difficult to be successfully authenticated by the server 110 to access a service(s) accessible by or through the server 110.

The service provider defines or sets, as a security rule, preferably a required number of the reference SR communication device(s) to be detected in the vicinity of the user device. The service provider may, as another security rule, let the user actually select the reference SR communication device(s) to be detected in the vicinity of the user device, so as to be authenticated successfully.

The server 110 may implicitly, i.e. through a machine learning process, build a security rule(s) for an adaptive authentication based on the reference SR communication device(s) present in the vicinity of the user device. For example, the user 11 logs in successfully several times using her/his login credentials, such as by having used a username, a password and/or an OTP. Each time, a set of BTH devices found in the vicinity of the PC 12 is also sent to the server 110. The server 110 notices that, on each of the successful login sessions, the D1 14 and D2 16, as BTH devices, are present. Using the machine learning, the server 110 may then build (or set) rules or cases A, B, and C that follow:

Case A: does not require any user credential (such as a password and/or an OTP) if the D1 14 and the D2 16, as two reference BTH devices, are locally present within the user environment;

Case B: requires a single credential if the D1 14 or the D2 16, as only one reference BTH device, is locally present within the user environment; or Case C: requires two user credentials (such as a password plus an OTP) if neither the D1 14 nor the D2 16, as no reference BTH device, is locally present within the user environment.

Alternatively, instead of using a machine learning process, such rules (or cases) are explicitly created by the user 11 or the server administrator, as the service provider.

The server 110 comprises one or several I/O interfaces (not represented) for communicating with the (server 110) exterior, such as one or several user devices, and one or several (micro)processors (not represented), as data processing means, which are internally linked together.

The server 110 comprises and/or is connected to one or several memories (not represented).

The server memory stores a database. The database registers, for a set of one or several users, one or several user identifiers in association with one or several identifiers relating to one or several reference SR communication devices to be detected in a vicinity of one or several user devices, as reference SR communication device(s) to be present in the local user environment.

The database also registers preferably, for each (identified) user, reference user authentication data in association with the user identifier(s) and the reference SR communication devices to be detected in the user device vicinity.

The database may also register, for each user, an history of a previous authentication session(s), and, when the user has been successfully authenticated, the identifier(s) of the reference SR communication device(s) that has(have) been detected in a vicinity of one or several user devices.

The server memory stores preferably, besides an OS, at least one authentication application algorithm accessible from the server 110 processor.

Such an authentication application algorithm allows, when executed by the server 110 processor, sending data including executable data, receiving one or several user identifiers along with one or several identifiers relating to one or several SR communication devices when the (identified) SR communication device(s) is or are present in a vicinity of the user device, comparing, for the identified user, one or several received SR communication device identifier(s) to one or several (registered) reference SR communication device identifier(s) and sending preferably one (or several) message(s) along with a result of the comparison between the received SR communication device identifier(s) and the reference SR communication device identifier(s).

According to an essential feature of the invention, the server 110 is configured to verify (or determine) whether (or not) one or several detected reference SR communication devices, as a predetermined part of (registered) reference SR communication devices, are in a vicinity of a user device, i.e. are locally present within the user environment.

In the affirmative, the server 110 authenticates successfully the concerned user by possibly sending a corresponding message, such as "Authentication success".

In the negative, the server 110 requests, through the user device, the user to submit user authentication data. Then, the server 110 receives submitted user authentication data. The server 110 verifies whether (or not) the submitted user authentication data matches the reference user authentication data. In the affirmative, the server 110 authenticates successfully the concerned user by sending preferably a corresponding message, such as "Authentication success". In the negative, the server 110 fails to authenticate the concerned user by sending possibly a corresponding message, such as "Authentication failure".

Thus, a matching of the received SR communication device identifier(s) and at least a predetermined part of the reference SR communication device identifier(s) allows the server 110 to authenticate successfully the concerned (identified) user (without having received any user authentication data).

When successfully authenticated, the server 110 may extend the open communication session with its interlocutor by a predetermined extension time period, so as to challenge regularly a presence of at least the predetermined part of the reference SR communication device(s) in the vicinity of the user device.

To authenticate its interlocutor, the server 110 has to receive, from its interlocutor, data matching at least the predetermined part of the reference data, so that the server 110 allows its interlocutor to discuss until an expiration time to be determined.

The server 110 is arranged to authorize (or forbid) its interlocutor to further exchange data while generating an expiration time each time the server 110 authenticates its interlocutor, as client.

To generate an expiration time, the server 110 adds preferably to a time at which the client has opened a communication session with the server 110 a predefined extension time period. The server 110 triggers a communication session timer preferably as soon as a client is logged on the server 110.

Preferably, the predefined extension time period is short, such as 1 min or a few minutes. Such a short predefined extension time period forces an interlocutor, namely a client, to authenticate regularly to the server 110, so as to be allowed to go on, in a progressive manner, communicating with the server 110.

The server 110 may process any request issued by the client while the expiration time has not elapsed. Otherwise, i.e. when the expiration time has elapsed, the server 110 may not process any request originating from the client.

As soon as the client does not submit one or several reference SR communication devices (which were present during the initial user authentication) to be detected in a vicinity of the user device possibly completed by reference user authentication data expected by the server 110, the server 110 closes the open communication session at the end of a last calculated expiration time, if any.

Such a closing may be due to a submission of non-sufficiently expected reference SR communication devices completed possibly by a submission of unexpected user authentication data.

When the server 110 authorizes to extend an open communication session for a first time, the server 110 extends the open communication session, once by the predefined extension time period, to an expiration time corresponding to a time at which the communication session is open completed by one extension time period.

When the server 110 authorizes to extend an open communication session for at least another time, the open communication session is extended at least by the predefined extension time period from the last calculated expiration time. The open communication session may be thus further periodically extended while the client sends to the server 110 expected authentication data.

The invention user authentication method relies thus on the presence of SR communication devices in the vicinity of the PC 12 from which the user 11 authenticates. The invention user authentication method allows a wide range of login (security) policy settings for adaptive authentication so that the type of authentication credential required for proving a user's identity to an online network or a local resource depends upon the user PC's environment. The login policy may either be explicitly set by the user 11 or the server 110 administrator. The login policy may be implicitly built over time using a machine learning process at the server 110 side. The invention also allows a continuous monitoring of the SR communication devices, as a user credential(s), such that the user login session can be revoked if a previously detected SR communication device is no longer detected.

Figure 2:
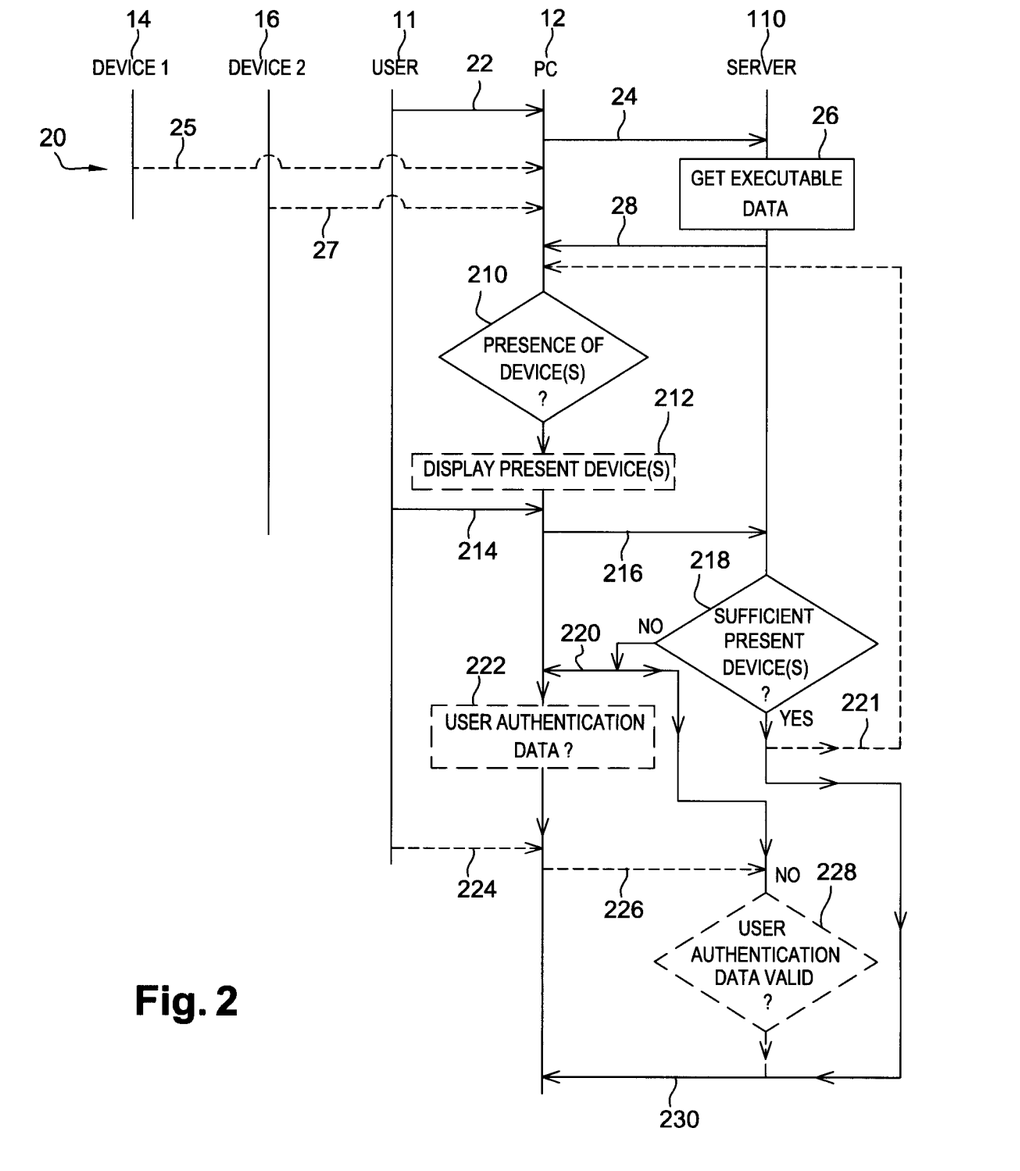
FIG. 2 represents an example of a flow of messages exchanged between the user, the PC, the possible SR communication device(s) and the server of the system of FIG. 1, so that the server authorizes (or not) the user device to continue an open communication session, thanks to one or two SR communication device identifiers (or not) and possibly user authentication data submitted (or not), through the client, to the server, when the user is authenticated (or not).

FIG. 2 depicts an example of a message flow 20 that involves the user 11, the PC 12, when present the D1 14 and/or the D2 16, and the server 110, so that the server 110 authenticates (or not) the user based on a presence of the D1 14 and/or the D2 16.

The FIG. 2 describes several flows related to the present invention, for example:
1. A user selection of which BTH device(s) detected in the vicinity of the PC 12 should be used as a submitted or a reference (for a future login attempt(s)) BTH device(s).
2. A user authentication with a scenario of case A, in which all of the BTH devices required to be present is detected and the user does not have to enter any user login credentials.
3. A user authentication with a scenario of case B or C, in which none or only a part or portion of BTH devices required to be present is detected and the user has to enter user login credentials.
4. The server 110 continuously monitors a presence of required BTH devices in the vicinity of the PC 12. When the previously detected BTH devices are no longer detected, the server 110 closes the authentication session.

It is assumed that the server 110 has previously registered (not represented) the User 11 IDentifier (or UID) in association with the D1 14 IDentifier 1 (or ID 1) and the D2 16 IDentifier 2 (or ID 2). The D1 14 and the D2 16 constitute two reference BTH (communication) devices to be locally present within the user environment, as a proof of trusted user environment, so as to automatically authenticate the user 11 (i.e. without submitting any user credentials, such as a password and/or an OTP).

To carry out such a device registration in association with an account of the user 11, the server 110 adds the D1 14 and the D2 16 further to an explicit user selection, among a set of SR communication devices, of the reference BTH devices to be locally present to automatically authenticate the user 11. Alternatively, the server 110 creates or updates automatically, for the concerned (identified) user, based on one or several previous successful authentications, a set of the identifiers of the reference BTH devices to be locally present to automatically authenticate the user 11.

The user 11 launches 22 an execution of the web type browser application, as client, supported by the PC 12, so that the user 11 logs in to the server 110.

Alternatively, instead of the user 11, the client is automatically launched (i.e. without any involvement of a user).

The client connects 24 to a login portal of the server 110.

The server 110 gets or retrieves 26 e.g., a JavaScript (or JS), as executable data.

The D1 may connect 25 to the PC 12, during a first pairing between the D1 and the PC 12. The first pairing may require the user 11 to submit authentication data that the PC 12 has to successfully verify to authorize the D1 pairing.

The D2 may connect 27 to the PC 12, during a second pairing between the D2 and the PC 12. The second pairing may require the user 11 to submit authentication data that the PC 12 has to successfully verify to authorize the D2 pairing.

The server 110 sends to the PC 12 a login page 28 including e.g., the JS.

The PC 12 loads the login page including the JS.

The PC 12, and more exactly the web type browser application, interprets and executes the received JS and looks up 210, while executing the JS, for a BTH device(s)

that may be present in a vicinity of the PC 12. Such a look up 210 for a BTH device(s) may require a web type browser add-on or extension.

The PC 12 detects 210 thus, while executing the JS, whether one or several identifiers relating to one or several BTH devices do or do not exist in the vicinity of the PC 12.

Optionally, the PC 12 displays (or lets display) 212, while still executing the JS, a set of BTH device(s) that is or are detected in the PC 12 vicinity.

After the BTH device presence detection step 210, the PC 12 may request (not represented), while still executing the JS, the user 11 to select, among the set of the detected BTH devices, one or several BTH devices to be used for authenticating the concerned user 11 as submitted (identified) BTH devices.

The user 11 enters 214, through an MMI relating or connected to the PC 12, a UID, such as a user name, an email address or an identifier relating to a user account.

Alternately, the PC 12 retrieves automatically a UID that is stored within a memory included or connected to the PC 12.

The PC 12 (and more exactly the client) sends 216 to the server 110 the UID and the identifier(s) relating to the BTH device(s) that the PC 12 has detected in the PC 12 vicinity.

The UID allows the server 110 to identify the concerned user and/or her/his account.

The server 110 verifies 218 whether the identifier(s) relating to the detected BTH device(s), if any, do(es) or do(es) not match an identifier(s) relating to at least a predetermined part of the reference BTH device(s). In other words, the server 110 verifies whether the detected BTH device(s) is(are) or is(are) not sufficient with respect to at least the predetermined part of the reference BTH device(s), so as to authenticate the user 11 without further requesting to the user 11 user authentication data.

Such a verification of sufficient detected BTH device(s) depends on the set security rules.

With the given example for the set security rules in the case A or B, if the server 110 receives, besides the UID, both the ID1 and the ID2, then the identifier(s) relating to the detected BTH device(s) match(es) at least the ID1 or the ID2, as the single or two identifier(s) relating to at least a predetermined part of the reference BTH device(s). In other words, the server 110 verifies that, for the concerned user, the detected BTH devices are sufficient with respect to at least the predetermined part of the reference BTH device(s).

With the given example for the set security rules in the case B, if the server 110 receives, besides the UID, only the ID1 or the ID2, then the identifier relating to the detected BTH device matches at least the ID1 or the ID2 respectively, as the single required identifier relating to at least the predetermined part of the reference BTH device(s). In other words, the server 110 verifies that, for the concerned user, the single detected BTH device is sufficient with respect to at least the predetermined part of the reference BTH device.

In such three positive scenarii in which the detected BTH device(s) is(are) sufficient with respect to at least the predetermined part of the reference BTH device(s), the server 110 authenticates the user 11. The server 110 therefore grants or authorizes access to a service(s) managed by or through the server 110. The server 110 sends 230 preferably to the PC 12 a corresponding message, like e.g, "Access granted".

In such three positive scenarii, the server 110 does not need to request to the user 11 user authentication data. Optionally, the server 110 transmits regularly, i.e. at the end of a predetermined time period, to the PC 12 a request 221 to get information about an existence of the BTH device(s) in the vicinity of the PC 12. Thus, the PC 12 continues to detect, while executing the executable data, whether the detected BTH device(s) do(es) or do(es) not still exist in the vicinity of the PC 12. After having repeated at least once the BTH device presence detection step 210 and the detected BTH device presence sufficiency step 218, the server 110 still grants access to the service(s) only if the detected ID1 and/or ID2 match(es) at least the predetermined part of the reference BTH device(s). Otherwise, i.e. if no detected BTH device or the detected ID1 or ID2 does no longer match at least the predetermined part of the reference BTH device(s), the server 110 denies access to the service(s) for the concerned user 11. The open communication session is stopped reducing therefore a risk of being attacked by an unauthorized user and/or software.

Otherwise, with the given example for the set security rules in cases C, B and A, if the server 110 does not receive, besides the UID, any identifier relating to a detected BTH device, the server 110 verifies that no detected BTH device identifiers match the ID1 and/or the ID2, as the single or two identifiers relating to at least the predetermined part of the reference BTH device(s).

Likewise, with the given example for the set security rules in case A, if the server 110 receives, besides the UID, only one identifier relating to a detected BTH device, the server verifies that the single detected BTH device identifier does not match the ID1 and the ID2, as the two identifiers relating to at least the predetermined part of the reference BTH device(s).

In other words, the server 110 verifies that, for the concerned user, no detected BTH device or only one detected BTH device is not sufficient with respect to at least the predetermined part of the reference BTH device(s).

In such four negative scenarii in which the absence of detected BTH device(s) or the presence of only one detected BTH device is not sufficient with respect to at least the predetermined part of the reference BTH device(s), the server 110 does not authenticate the user 11. The server 110 therefore denies access to the service(s) managed by or through the server 110 while requesting one or several user credentials, as user authentication data.

The server 110 sends preferably to the PC 12 a corresponding message 220 including a request to get user authentication data, like e.g, "please enter your password" and/or "please enter an OTP". Such a message may include or be accompanied with further JS, as executable data, or a command to display the request to get the user authentication data.

Optionally, the PC 12 displays or lets display 222, while executing the received further JS or display command, the request to get user authentication data.

The user 11 enters 224, through the MMI and/or one or several sensors relating or connected to the PC 12, one or several user credentials, such as a password, an OTP, biometric features and/or the like.

The PC 12 sends back, as request 220 response, to the server 110 the submitted user credential(s) 226, as user authentication data.

The server 110 verifies 228 whether the submitted user credential(s) do(es) or do(es) not match the reference user credential(s). In the affirmative, the server 110 validates the user authentication data and authenticates the user 11 while granting access to the service(s) managed by or through the server 110. In the negative, i.e. the submitted user credential(s) do(es) not match reference user credential(s), the server 110 does not validate the user authentication data and does not authenticate the user 11 while denying access to the service(s) managed by or through the server 110.

The invention solution allows carrying out a secure user authentication based on a local presence, i.e. in the vicinity of the user device, of SR communication device(s) to be recognized remotely, through the user device, by the server.

There is, thanks to the invention, no need to request the client to provide explicitly the server 110 with (user) authentication data. As a matter of fact, the server 110 may grant automatically access while detecting remotely a reference SR communication device(s) in the vicinity of the device that accesses the server 110, as a proof of trusted (user) environment.

The embodiment that has just been described is not intended to limit the scope of the concerned invention. Other embodiments may be given. As another embodiment, instead of using a BTH technology, the device may communicate through any other SR technology(ies), like e.g., a Wi-Fi, NFC and/or a BLE type technology(ies).

The invention claimed is:

1. A method for authenticating a user,
   wherein, a server registering at least one user identifier associated with at least one identifier relating to at least one reference short range communication device to be detected on-line, through a user device, in a vicinity of the user device, the method comprises the following steps:
   connecting, to the server, from the user device, through a supported Web type application or browser;
   loading, from the server, to the user device, data including executable data;
   detecting on-line, by the user device, through the Web type application or browser that executes the executable data, whether at least one identifier relating to at least one short range communication device does or does not exist in a vicinity of the user device;
   sending, from the user device, to the server, at least one user identifier accompanied with the at least one detected short range communication device identifier only if the at least one identifier relating to at least one detected short range communication device exists in the vicinity of the user device;
   identifying, by the server, based on the at least one received user identifier, the user;
   verifying, by the server, for the identified user, whether the at least one detected short range communication device identifier is or is not present and, only if the at least one detected short range communication device identifier is present, whether the at least one detected short range communication device identifier does or does not match at least a predetermined part of the at least one reference short range communication device identifier; and
   granting access, from the server, only if the at least one detected short range communication device identifier is present and matches the at least predetermined part of the at least one reference short range communication device identifier,
      wherein the server creates or updates, based on at least one previous successful authentication, in association with at least one registered user identifier, a set of at least one identifier relating to at least one short range communication device, as the at least one identifier relating to at least one reference short range communication device to be detected in the vicinity of the user device;
      wherein the at least one previous successful authentication is based upon the at least one user identifier and at least one login credential sent from the user device to the server, and wherein the method further includes:
      building, by the server, at least one security rule that determines a login credential requirement for subsequent authentications, based upon the set of at least one identifier relating to at least one short range communication device.

2. The method according to claim 1, wherein, prior to detecting by the user device whether the at least one identifier relating to at least one short range communication device does or does not exist, the at least one short range communication device is paired with the user device.

3. The method according to claim 1, wherein, prior to sending to the server from the user device the at least one user identifier accompanied with the at least one detected short range communication device identifier, the user device involves the user to select the at least one detected short range communication device identifier.

4. The method according to claim 1, wherein, when the user is authenticated without having submitted user authentication data, the user device continues to detect on-line, through the Web type application or browser that executes the executable data, whether the at least one detected short range communication device identifier does or does not still exist in the vicinity of the user device; and
   still granting access, from the server, only if the at least one detected short range communication device identifier is still present and still matches the at least predetermined part of the at least one reference short range communication device identifier; or
   denying access only either if the at least one detected short range communication device identifier does no longer match the at least predetermined part of the at least one reference short range communication device identifier or if there is no detected short range communication device identifier.

5. The method according to claim 1, wherein an administrator of the server defines, as a security rule, a required number of the at least one reference short range communication device to be detected on-line in the vicinity of the user device.

6. The method of claim 1, wherein the security rule establishes a number of login credentials required for subsequent authentication, which is based upon the number of detected short range communication device identifiers sent from the user device that correspond to identifiers in said set.

7. The method of claim 6, wherein the required number of login credentials is inversely related to the number of corresponding identifiers in said set.

8. A system for authenticating a user,
   wherein, the system including a server and at least one user device, the server registering at least one user identifier associated with at least one identifier relating to at least one reference short range communication device to be detected on-line, through a user device, in a vicinity of the user device, the user device including at least one processor, the user device processor being configured to connect, through a supported Web type application or browser, to the server;
   the server including at least one processor, the server processor is configured to load into the user device data including executable data;
   and the user device processor is configured to:
      detect on-line, through the Web type application or browser that executes the executable data, whether at least one identifier relating to at least one short range communication device does or does not exist in a vicinity of the user device;

send, to the server, at least one user identifier accompanied with the at least one detected short range communication device identifier only if the at least one identifier relating to at least one detected short range communication device exists in the vicinity of the user device; and the server processor is configured to:

identify, based on the at least one received user identifier, the user;

verify, for the identified user, whether the at least one detected short range communication device identifier is or is not present and, only if the at least one detected short range communication device identifier is present, whether the at least one detected short range communication device identifier does or does not match at least a predetermined part of the at least one reference short range communication device identifier; and grant access only if the at least one detected short range communication device identifier is present and matches the at least predetermined part of the at least one reference short range communication device identifier, wherein the server creates or updates, based on at least one previous successful authentication, in association with at least one registered user identifier, a set of at least one identifier relating to at least one short range communication device, as the at least one identifier relating to at least one reference short range communication device to be detected in the vicinity of the user device;

wherein the at least one previous successful authentication is based upon the at least one user identifier and at least one login credential sent from the user device to the server, and wherein the server is configured to:

build at least one security rule that determines a login credential requirement for subsequent authentications, based upon the set of at least one identifier relating to at least one short range communication device.

* * * * *